(12) United States Patent
Nakazawa

(10) Patent No.: US 8,908,245 B2
(45) Date of Patent: Dec. 9, 2014

(54) IMAGE SCANNING DEVICE AND IMAGE FORMING APPARATUS

(71) Applicant: Masamoto Nakazawa, Kanagawa (JP)

(72) Inventor: Masamoto Nakazawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 32 days.

(21) Appl. No.: 13/912,341

(22) Filed: Jun. 7, 2013

(65) Prior Publication Data

US 2014/0029065 A1    Jan. 30, 2014

(30) Foreign Application Priority Data

Jul. 25, 2012   (JP) .................. 2012-165250

(51) Int. Cl.
*G03F 3/08* (2006.01)
*H04N 1/46* (2006.01)
*H04N 9/64* (2006.01)
*H04N 1/407* (2006.01)

(52) U.S. Cl.
CPC ..................................... *H04N 1/407* (2013.01)
USPC ............ 358/518; 358/504; 358/505; 348/243

(58) Field of Classification Search
CPC ..... H04N 5/361; H04N 5/357; H04N 1/1911; H04N 1/1915
USPC ............................ 358/518, 504, 505; 348/243
See application file for complete search history.

(56) References Cited

U.S. PATENT DOCUMENTS

| 6,606,172 | B1 * | 8/2003 | Moro ............................ 358/483 |
| 6,683,703 | B1 * | 1/2004 | Iwai ............................. 358/461 |
| 2007/0188638 | A1 | 8/2007 | Nakazawa et al. |
| 2008/0252787 | A1 | 10/2008 | Nakazawa et al. |
| 2010/0027061 | A1 | 2/2010 | Nakazawa |
| 2010/0142009 | A1 | 6/2010 | Tsukahara et al. |
| 2010/0171998 | A1 | 7/2010 | Nakazawa |
| 2011/0026083 | A1 | 2/2011 | Nakazawa |
| 2011/0051201 | A1 | 3/2011 | Hashimoto et al. |
| 2011/0063488 | A1 | 3/2011 | Nakazawa |
| 2012/0008173 | A1 | 1/2012 | Konno et al. |
| 2012/0092732 | A1 | 4/2012 | Nakazawa |
| 2012/0224205 | A1 | 9/2012 | Nakazawa |
| 2013/0063792 | A1 | 3/2013 | Nakazawa |
| 2013/0258144 | A1 * | 10/2013 | Chen et al. .................... 348/243 |

FOREIGN PATENT DOCUMENTS

JP           2010-136164           6/2010

* cited by examiner

*Primary Examiner* — Charlotte M Baker

(74) *Attorney, Agent, or Firm* — Oblon, Spivak, McClelland, Maier & Neustadt, L.L.P.

(57) ABSTRACT

According to an embodiment, an image scanning device includes: a light source unit that emits light onto an original to be scanned; a photoelectric conversion unit that converts light from the original to an electric signal; a converting unit that converts the electric signal from the photoelectric conversion unit into digital image data; and a black correcting unit that performs black correction by correcting pixel-by-pixel black levels of pixels contained in pre-scanning digital image data obtained before the original is scanned based on a ratio of a dark-current black level of a pixel contained in ongoing-scanning digital image data obtained during scanning of the original to a dark-current black level of the pixel contained in the pre-scanning digital image data, and subtracting the corrected pixel-by-pixel black levels from the ongoing-scanning digital image data.

12 Claims, 8 Drawing Sheets

(WITH ABSENCE OF DEFECTIVE PIXEL)

(WITH PRESENCE OF DEFECTIVE PIXEL)

(TEMPERATURE DISTRIBUTION)

(ACTUAL DISTRIBUTION OF BLACK LEVELS)

IMAGE SCANNING DEVICE AND IMAGE FORMING APPARATUS

CROSS-REFERENCE TO RELATED APPLICATIONS

The present application claims priority to and incorporates by reference the entire contents of Japanese Patent Application No. 2012-165250 filed in Japan on Jul. 25, 2012.

BACKGROUND OF THE INVENTION

1. Field of the Invention

The present invention relates generally to image scanning devices and image forming apparatuses.

2. Description of the Related Art

Conventional image scanning devices may perform photoelectric conversion of light (reflection light) reflected from an original document using a photoelectric transducer, such as a charge coupled device (CCD) image sensor, to generate an image signal representing an image of the original and convert the image signal into digital image data by analog-to-digital (A/D) conversion. A dark current flows through a photoelectric transducer even when light is not incident on the photoelectric transducer. Accordingly, such an image scanning device typically performs black level correction (hereinafter, "black correction") to eliminate an effect of the dark current produced in the photoelectric transducer.

This black correction is performed by obtaining black levels of pixels in a dark condition, in which a light source is off, and subtracting the obtained black levels, as correction data, from image data obtained by scanning an original document. It is inefficient to obtain black-level correction data by switching off the light source each time scanning is performed; this is because time to wait for light amount to be stabilized is required each time the light source is switched on for scanning. According to a technique for black correction disclosed in Japanese Patent Application Laid-open No. 2010-136164, pixel-by-pixel black-level correction data obtained before starting scanning is updated based on a black level of shaded (optical black (OPB)) pixels.

However, the conventional technique described above updates all of the pixels of the pixel-by-pixel black-level correction data obtained before starting scanning evenly based on the black level of the OPB pixels. Accordingly, there can be a case where black correction cannot be performed appropriately when, for instance, amounts of change in dark current vary from pixel to pixel due to temperature distribution in a chip of the photoelectric transducer and/or a manufacturing process of the photoelectric transducer.

In view of the above circumstance, there is a need for an image scanning device capable of performing black correction even when amounts of change in dark current vary from pixel to pixel and an image forming apparatus including the image scanning device.

It is an object of the present invention to at least partially solve the problem in the conventional technology.

SUMMARY OF THE INVENTION

It is an object of the present invention to at least partially solve the problems in the conventional technology.

According to the present invention, there is provided: an image scanning device comprising: a light source unit configured to emit light onto an original to be scanned; a photoelectric conversion unit configured to convert light reflected from the original to an electric signal; a converting unit configured to convert the electric signal from the photoelectric conversion unit into digital image data; and a black correcting unit configured to perform black correction by correcting pixel-by-pixel black levels of pixels contained in pre-scanning digital image data obtained before the original is scanned based on a ratio of a dark-current black level of a pixel contained in ongoing-scanning digital image data obtained during scanning of the original to a dark-current black level of the pixel contained in the pre-scanning digital image data, and subtracting the corrected pixel-by-pixel black levels from the ongoing-scanning digital image data.

The present invention also provides an image forming apparatus comprising the above-mentioned image scanning device.

The present invention also provides an image scanning device comprising: a light source unit configured to emit light onto an original to be scanned; a photoelectric conversion unit configured to convert light reflected from the original to an electric signal; a converting unit configured to convert the electric signal from the photoelectric conversion unit into digital image data; and a black correcting unit configured to perform black correction by correcting pixel-by-pixel black levels of pixels contained in pre-scanning digital image data obtained before the original is scanned based on distribution of dark-current black levels of pixels contained in the pre-scanning digital image data, and subtracting the corrected pixel-by-pixel black levels from ongoing-scanning digital image data obtained during scanning of the original.

The present invention also provides an image forming apparatus comprising the above-mentioned image scanning device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments are described in detail below with reference to the accompanying drawings. The embodiments are described below by way of examples of image scanning devices each performs photoelectric conversion of light (reflection light) reflected from an original document using a photoelectric transducer, such as a CCD image sensor, to generate an image signal representing an image of the original and converts the image signal into digital image data by A/D conversion, and an image forming apparatus, such as a multifunction peripheral (MFP), that includes the image scanning device. Application of the image scanning device includes, but is not limited to, those described below. The image scanning device may be used independently, or applied to various types of image forming apparatus that outputs an image onto an image forming medium. The embodiments described below may be combined as appropriate.

Dark current and conventional black correction are described below.

Figure 1:
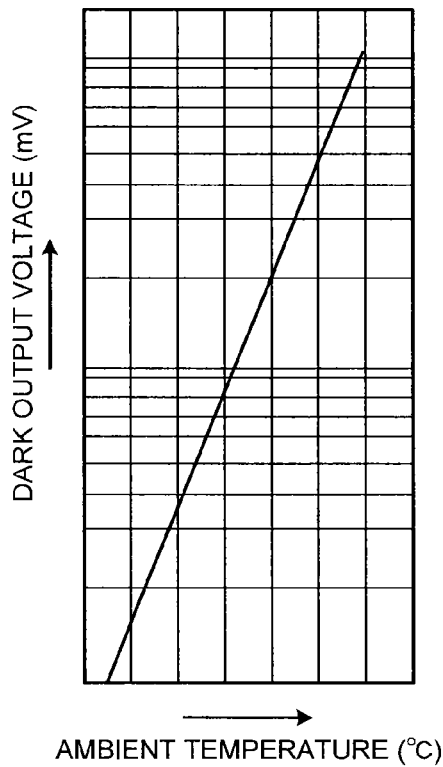
FIG. 1 is a graph of relationship between ambient temperature and dark output voltage.

First, dark current (dark output voltage) is described below. Dark current flows through a photoelectric transducer of an image scanning device even when light is not incident on the photoelectric transducer. FIG. 1 is a graph of relationship between ambient temperature and dark output voltage.

As illustrated in FIG. 1, an output signal of a photoelectric transducer, such as a CCD or complementary metal-oxide semiconductor (CMOS) image sensor, contains a dark output voltage (mV) that depends on an ambient temperature (° C.). This dark output voltage is primarily produced by dark current that flows through pixels (photodiodes) even when light is not incident on the photodiodes. Causes of this dark current include a thermal factor and a defective pixel. One characteristic of the dark current is that the dark current increases with the temperature. The dark output voltage behaves similarly when the photoelectric transducer's light accumulation period is fixed.

Because the dark output voltage can be a cause of readout error of a high-density (black) portion, an image scanning device, such as a scanner, typically performs black correction that eliminates effect of the dark output voltage. Black correction is performed by obtaining pixel-by-pixel black levels in a dark condition where a lamp (light source unit) for scanning an original document is off, and subtracting the obtained black levels, as correction data, from image data. Because the dark output voltage changes with the temperature (elapsed time), it is necessary to obtain black levels each time scanning is performed when a plurality of original documents is to be scanned. However, obtaining black-level correction data by switching off the light source each time scanning is performed undesirably reduces productivity. This is because time to wait for stabilization of light amount is required each time the light source is switched on after being switched off.

One of techniques for reducing change over time in black level while avoiding this reduction in productivity is a method of performing black correction while updating pixel-by-pixel black-level correction data obtained before starting scanning according to a black level of shaded (OPB) pixels.

Figure 2:
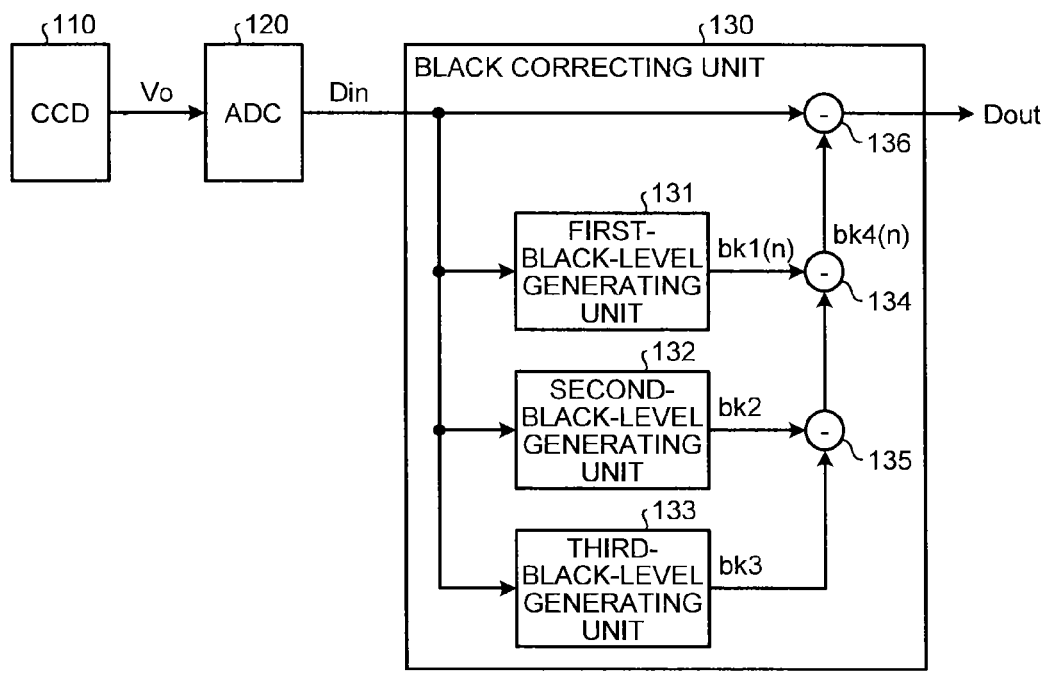
FIG. 2 is a block diagram illustrating a functional configuration for conventional black correction.

FIG. 2 is a block diagram illustrating a functional configuration for conventional black correction. As illustrated in FIG. 2, an output signal (Vo) of a CCD 110 is converted by an analog-to-digital converter (ADC) 120 into digital image data (Din). The digital image data Din is input to a black correcting unit 130.

The black correcting unit 130 includes a first-black-level generating unit 131, a second-black-level generating unit 132, a third-black-level generating unit 133, and arithmetic units 134 to 136. The first-black-level generating unit 131 obtains pixel-by-pixel pre-scanning black levels (bk1(n)) (n: pixel number (pixel signal)) obtained before scanning of an original document (in a lamp-off state). Simultaneously when the first-black-level generating unit 131 obtains the black levels of the pixel numbers (n), the second-black-level generating unit 132 obtains a pre-scanning black level (bk2) of OPB pixels. Thereafter, the third-black-level generating unit 133 obtains an ongoing-scanning black level (bk3) of the OPB pixels during scanning of the original. Subsequently, the arithmetic units 134 and 135 correct bk1(n) using Equation (1) below to obtain bk4(n):

$$bk4(n)=bk1(n)-(bk2-bk3)=bk1(n)+(bk3-bk2) \quad (1)$$

where n is the pixel signal.

Put another way, the arithmetic units 134 and 135 generate the black levels bk4(n) by adding an amount of change over time (hereinafter, "temporal change") in the black level of the OPB pixels to the black levels bk1(n). Subsequently, the black correcting unit 130 performs black correction by causing the arithmetic unit 136 to subtract the black levels bk4(n) from the digital image data (Din) to obtain black-corrected digital image data (Dout). The black correcting unit 130 outputs the black-corrected digital image data (Dout).

Figure 3:
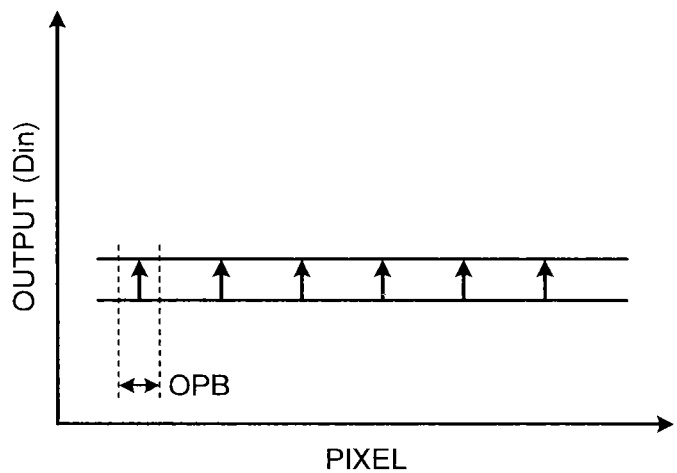
FIG. 3 is a schematic diagram illustrating conventional black correction with absence of a defective pixel.
Figure 4:
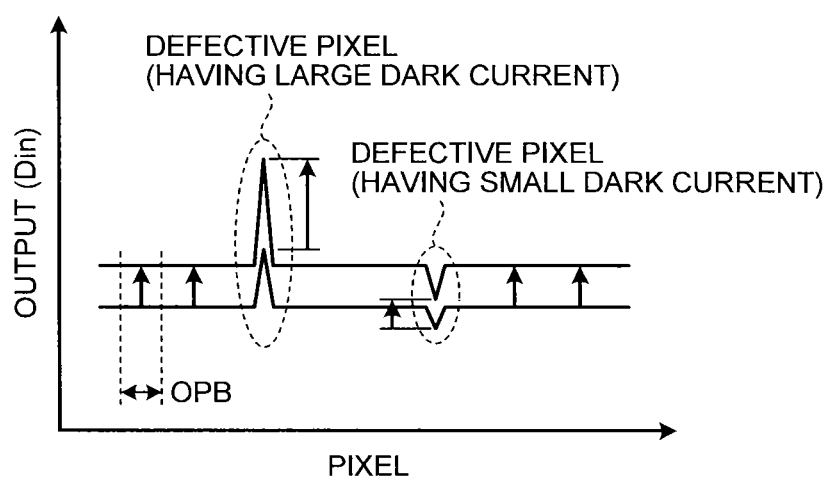
FIG. 4 is a schematic diagram illustrating conventional black correction with presence of defective pixels.

FIG. 3 is a schematic diagram illustrating conventional black correction with absence of a defective pixel. FIG. 4 is a schematic diagram illustrating conventional black correction with presence of defective pixels. As illustrated in FIG. 3, with the absence of a defective pixel, the black levels of the pixels, including the black level of the OPB pixels, uniformly change with time (temperature). Accordingly, the conventional black correction method described above can correct the temporal change by adding the amount of change in black level of the OPB pixels to the pixel-by-pixel black levels.

However, as illustrated in FIG. 4, with the presence of a defective pixel, the temporal change cannot be corrected by simply adding the amount of change in black level of the OPB pixels to the pixel-by-pixel black levels. This is because an amount of temporal change in black level of the defective pixels is not the same as an amount of change in black level of the OPB pixels. For instance, an amount of temporal change in a defective pixel having a large intrinsic dark current is larger than the amount of temporal change in the OPB pixels, whereas an amount of temporal change in a defective pixel having a small intrinsic dark current is smaller than the amount of temporal change of the OPB pixels. This is because the dark current Idark is proportional to the temperature as approximated by Expression (2) below:

$$Idark \propto \exp(-Ea/(kT/q)) \quad (2)$$

where Ea is activation energy (silicon), k is the Boltzmann constant, T is the ambient temperature, and q is electron charge (elementary charge).

As indicated by Expression (2), the dark current changes at a rate that depends on the temperature (for instance, the dark current is approximately doubled by a rise of 10° C. with an ambient temperature of 25° C.) Accordingly, a defective pixel, which differs from other pixels in intrinsic dark current, differs from the OPB pixels in the amount of temporal change in black level. Note that dark currents or, in other words, dark output voltages, of all of the pixels, including the defective pixels, change at a same rate in relation to the temperature.

First Embodiment

An image scanning device according to a first embodiment is described below based on the characteristic of the dark current described above and the conventional black correction method. The image scanning device according to the first embodiment is configured to perform black correction in a manner described below. Electric signal output from a photoelectric conversion unit is converted into digital image data. Pixel-by-pixel black levels of a pixel contained in pre-scanning digital image data, which is obtained before an original document is scanned, are corrected based on a ratio of a dark-current black level of the pixel contained in ongoing-scanning digital image data, which is obtained during scanning of the original, to a dark-current black level of the pixel contained in the pre-scanning digital image data. The corrected pixel-by-pixel black levels are subtracted from the ongoing-scanning digital image data.

Figure 5:
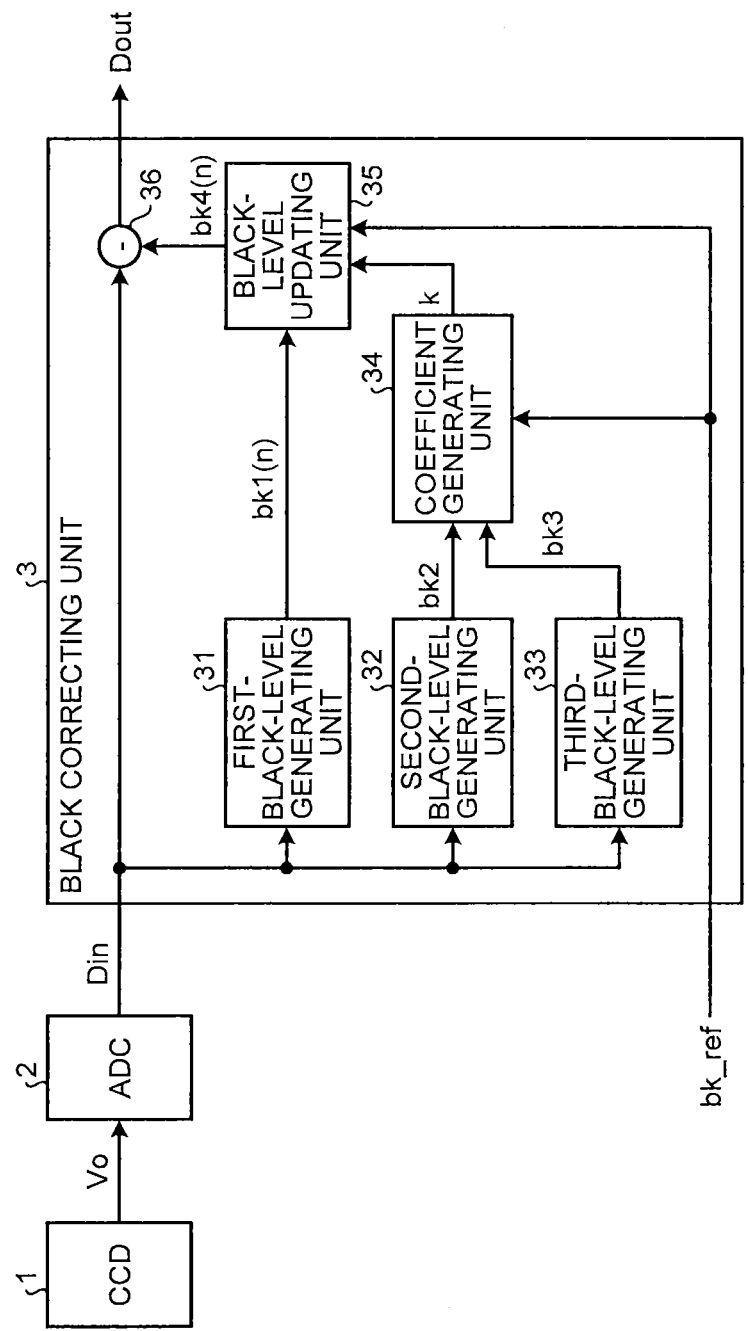
FIG. 5 is a block diagram illustrating a functional configuration for black correction according to a first embodiment.

FIG. 5 is a block diagram illustrating a functional configuration for black correction according to the first embodiment. As illustrated in FIG. 5, as in the conventional black correction, an output signal (Vo) of a CCD 1 is converted by an analog-to-digital converter (ADC) 2 into digital image data (Din). The digital image data Din is input to a black correcting unit 3.

The black correcting unit 3 includes a first-black-level generating unit 31, a second-black-level generating unit 32, a third-black-level generating unit 33, a coefficient generating unit 34, a black-level updating unit 35, and an arithmetic unit 36. The first-black-level generating unit 31 obtains pixel-by-pixel pre-scanning black levels (first black levels) (bk1(n)) (n: pixel number) from digital image data Din obtained before scanning of an original document (in a lamp-off state). Simultaneously when the first-black-level generating unit 31 obtains the pre-scanning black levels of the pixel numbers (n), the second-black-level generating unit 32 obtains a black level (second black level) (bk2) of OPB pixels from the digital image data Din. Thereafter, the third-black-level generating unit 33 obtains an ongoing-scanning black level (third black level) (bk3) of the OPB pixels from ongoing-scanning digital image data Din obtained during scanning of the original.

The pre-scanning black level (bk2) of the OPB pixels obtained by the second-black-level generating unit 32 and the ongoing-scanning black level (bk3) of the OPB pixels obtained by the third-black-level generating unit 33 are input to the coefficient generating unit 34. The coefficient generating unit 34 computes Equation (3) below each time the black level bk3 is updated.

$$k=(bk3-bk\_ref)/(bk2-bk\_ref) \quad (3)$$

In Equation (3), bk_ref is a reference black level, which is a value designated as appropriate in advance and stored in a register or the like. It is assumed that the reference black level bk_ref corresponds to a black level of pixels of the CCD 1 in a zero-dark-current state. The coefficient generating unit 34 calculates a ratio of a difference between the black level (bk3) of the OPB pixels and the reference black level to a difference between the black level (bk2) of the OPB pixels and the reference black level. The reason for obtaining this ratio is as follows. A certain offset level is generally added to black levels to avoid zero saturation. Therefore, a ratio of the black levels themselves differs from a ratio between actual dark output voltages (amounts of dark currents). The coefficient generating unit 34 calculates a ratio of change (hereinafter, "change ratio") (k) in black level of the OPB pixels between when the pre-scanning black level is obtained and when the ongoing-scanning black level is obtained using Equation (3). The calculated change ratio (k) is input to the black-level updating unit 35.

The black-level updating unit 35 computes Equation (4) below to correct temporal change in the pixel-by-pixel black levels by multiplying the pixel-by-pixel black levels (bk1(n)) by the input change ratio (k):

$$bk4(n)=(bk1(n)-bk\_ref)*k+bk\_ref \quad (4)$$

where n is the pixel signal.

The corrected black levels (bk4(n)) obtained by the black-level updating unit 35 is input to the arithmetic unit 36. The arithmetic unit 36 performs black correction by subtracting the corrected black levels bk4(n) from the digital image data (Din) to obtain black-corrected digital image data (Dout). The black correcting unit 3 outputs the black-corrected digital image data (Dout). More specifically, the black correcting unit 3 outputs the digital image data (Dout), of which black levels are corrected appropriately, in a situation where amounts of change in dark current of the pixels of the CCD 1 vary from pixel to pixel.

The dark output voltage is proportional to a product of the dark current and a light accumulation period of the CCD 1. Accordingly, the black correcting unit 3 may calculate the reference black level from two black levels obtained by causing the CCD 1 to accumulate light for different periods of time before scanning of the original using Equation (5) below, for example:

$$bk\_ref=(Ta*bk(Ta)-Tb*bk(Ta))/(1-Tb) \quad (5)$$

where Ta is an accumulation period A, Tb is an accumulation period B, bk(Ta) is black level of the accumulation period A, and bk(Tb) is black level of the accumulation period B.

Figure 6:
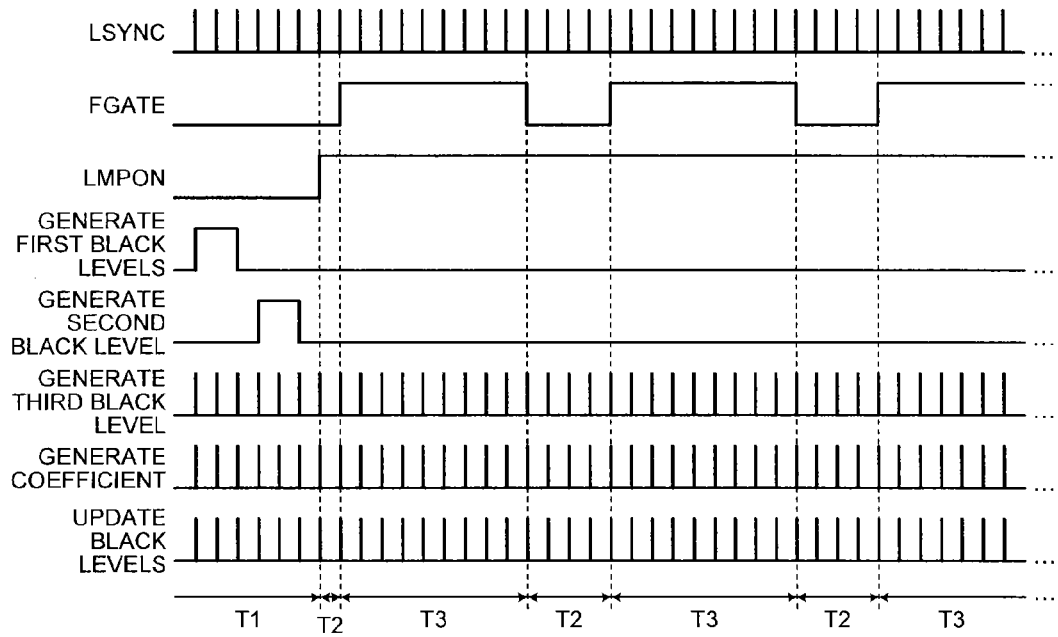
FIG. 6 is a timing chart of an example of operation timing for black correction.
Figure 7:
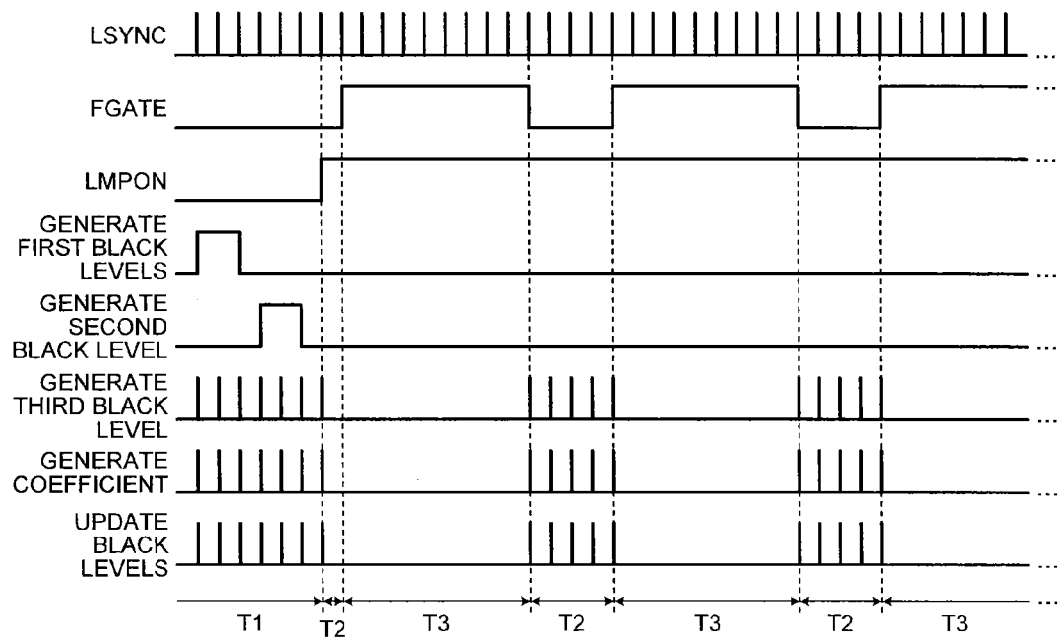
FIG. 7 is a timing chart of an example of operation timing for black correction.
Figure 8:
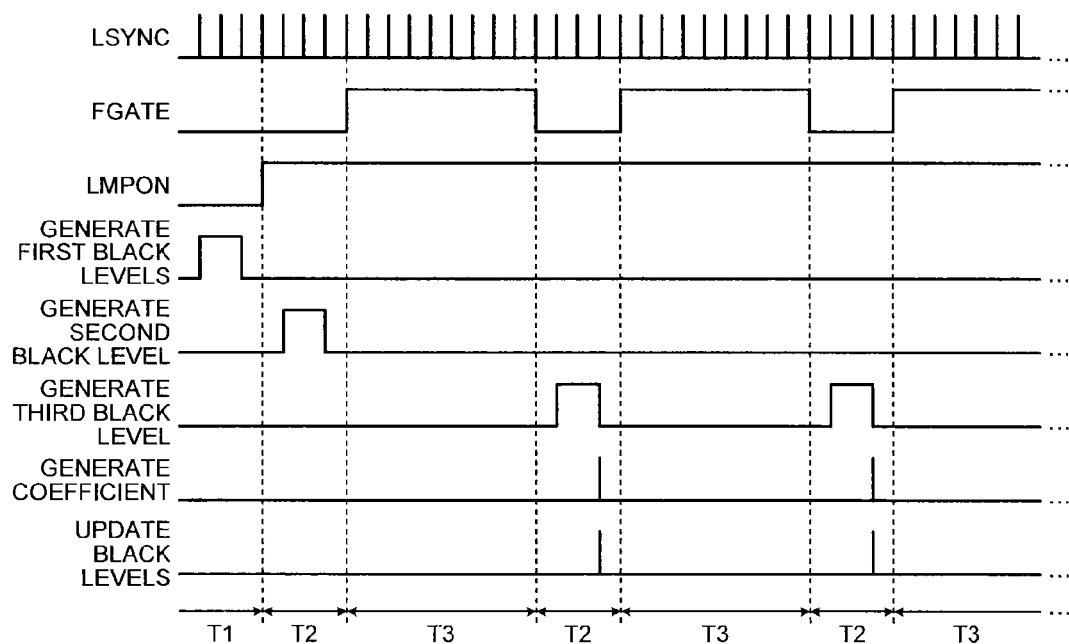
FIG. 8 is a timing chart of an example of operation timing for black correction.

Operation timing for the black correcting unit 3 is described below. FIGS. 6 to 8 are timing charts each illustrating an example of operation timing for black correction.

Signals illustrated in FIGS. 6 to 8 are for controlling the operation timing for the black correcting unit 3. The signals are a line synchronization (LSYNC) signal, an original scanning period (FGATE) signal, a lamp (light source)-ON (LMPON) signal, first/second/third-black-level generating signals indicating timing for generation of the first/second/third black levels, a coefficient generating signal indicating timing for generation of the coefficient (k), and a black-level updating signal indicating timing for updating the black levels. More specifically, the signals are output from a timing generator (TG) 201a under control of a control unit 203a (see FIG. 12).

As illustrated in FIG. 6, the first black levels and the second black level are generated in a period T1 (the FGATE signal is low (L) and the LMPON signal is L), which is a period before the lamp is on. As described above, the first black levels are the pixel-by-pixel black levels of the pixels of the CCD 1. The second black level is the black level of the OPB pixels. Subsequently, the third black level (the ongoing-scanning black level of the OPB pixels) is generated in a period T3 (the FGATE signal is high (H) and the LMPON signal is H) where the lamp is on and the original is scanned. Simultaneously, generation of the coefficient and updating of the black levels are performed. Although timing for subtracting the updated black levels (bk4(n)) from the digital image data (Din) is not illustrated in FIG. 6, subtraction may be performed pixel by pixel when the digital image data (Din) is input. In the example illustrated in FIG. 6, the generation of the third black level, the generation of the coefficient, and the updating of the black levels are constantly performed on a line-by-line basis. However, these operations may be suspended in a period(s) (e.g., periods T2) other than the period in which image scanning of the original is performed so long as the operations are performed in the period in which the original is scanned.

As illustrated in FIG. 6, temporal change within an image and temporal change between images can be reduced by obtaining the third black levels, which are the black levels of the OPB pixels obtained at different elapsed time, for each line. In this case, it is preferable that the second-black-level generating unit 32 obtains, as the second black level, a mean value of black levels of a plurality of pixels or a plurality of lines; and the third-black-level generating unit 33 obtains, as the third black levels, weighted averages of black levels of a plurality of pixels or a plurality of lines. Obtaining the second black level and the third black levels in this way allows eliminating an effect of noise.

According to the timing for black correction illustrated in FIG. 6, temporal change is corrected on the line-by-line basis. Accordingly, even temporal change within a single scanned image can be reduced. However, the second black level is produced in the period T1 where the lamp is off, whereas the third black levels are generated in the period T3 where the lamp is on. Accordingly, there arises a difference in degree of effect of smear between the second black level and the third black levels.

Smear is a phenomenon caused by extra charge produced by light incident on a portion of the CCD 1 other than the photodiodes and added to a signal charge representing an image. Smear appears as an increase in black level. An amount of smear is proportional to an amount of light incident on all the pixels. More specifically, during scanning of an original document, an amount of light incident on all the pixels varies from line to line depending on a picture, text characters, and a pattern on the scanned original. Accordingly, the method that generates the third black level for each line during image scanning in the manner illustrated in FIG. 6 can fail to correct temporal change properly because the degree of effect of smear varies from line to line. Meanwhile, it generally takes several seconds at longest to scan one sheet of an original document, and therefore temporal change is negligible. Accordingly, correcting temporal change within a single scanned image is not necessarily required.

In view of the above, a scheme to suspend correcting temporal change during image scanning can be employed. Specifically, according to this scheme, as illustrated in FIG. 7, the generation of the third black level, the generation of the coefficient, and the updating of the black levels are not performed in the period T3 (the FGATE signal is H), in which the original is scanned, but performed in the period T2 (the FGATE signal is L), in which the original is not scanned. According to this scheme, because temporal change is corrected in the period where the original is not scanned but not corrected in the period where the original is scanned, the effect of smear described above can be avoided.

The effect of smear can be further reduced by a scheme that causes the second black level and the third black level to be generated from a same scan subject (original document). More specifically, according to this scheme, as illustrated in FIG. 8, timing for generating the first black levels is the same as that in the example illustrated in FIGS. 6 and 7; however, the second black level and the third black level are generated in the period T2 (the FGATE signal is L and the LMPON signal is H) where the lamp is on and the original is not scanned. When the second black level and the third black level are generated invariably when a same subject, such as a background plate, is scanned, effect of the smear on the second black level becomes equal to effect of the smear on the third black level. As a result, effect of the smear on temporal change correction can be cancelled out and reduced to substantially zero.

In the example illustrated in FIG. 8, because correcting temporal change on the line-by-line basis is unnecessary, the second black level and the third black level are generated one time before scanning of the original. Nevertheless, noise reduction can be achieved by causing the second-black-level generating unit 32 to obtain, as the second black level and the third black level, mean values of the plurality of pixels or the plurality of lines. The generation of the coefficient and the updating of the black levels are to be performed after the third black level is generated.

Second Embodiment

In the first embodiment described above, it is assumed that temperature distribution among the pixels of the CCD 1 is uniform. However, there can be case where the temperature distribution becomes nonuniform in a direction in which the pixels are arranged due to heat from an output circuit when the photoelectric transducer, such as the CCD 1, is operated at high speed. (For instance, in a CCD, an output circuit is generally arranged at one end of an array of pixels. Accordingly, temperatures of pixels near the output circuit are higher.) When the temperature distribution is nonuniform due to such variation in temperature among the pixels, temporal change in black level cannot be correct properly.

Figure 9:
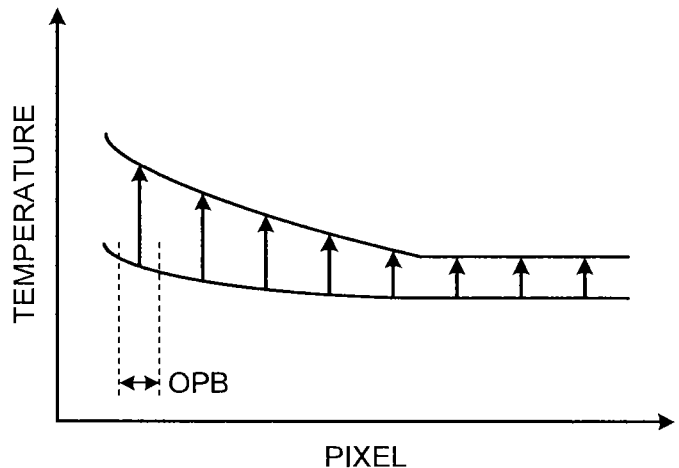
FIG. 9 is a schematic diagram illustrating temperature distribution among pixels.
Figure 10:
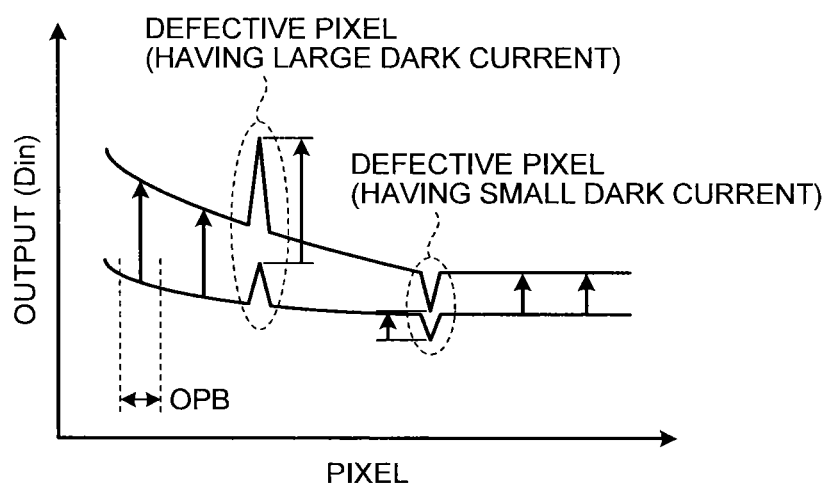
FIG. 10 is a schematic diagram illustrating black levels of pixels that contain defective pixels and have the temperature distribution illustrated in FIG. 9.

FIG. 9 is a schematic diagram illustrating temperature distribution among pixels. FIG. 10 is a schematic diagram illustrating black levels of pixels that contain defective pixels and have the temperature distribution illustrated in FIG. 9.

Referring to the temperature distribution illustrated in FIG. 9, the temperature is higher at pixels near the OPB pixels and decreases with distance from the OPB pixels. When the pixels have nonuniform temperature distribution as in the illustrated example, temporal change in temperature is also nonuniform in such a manner that a rise in temperature is large at a portion where the temperature is high, while the rise is small at a portion where the temperature is low.

When the pixels contain defective pixels and have nonuniform temperature distribution as illustrated in FIG. 10, the dark current or, in other words, the dark output voltage, is expressed by proportionality using the function of the temperature as indicated by Expression (2). Accordingly, black levels according to the temperature distribution illustrated in FIG. 9 can be obtained. The black levels change with time in the manner that depends on the temperature as described above. Thus, illustrated in FIG. 10 is a combination of this temperature distribution and increase/decrease in black level caused by the defective pixels.

When pixels have nonuniform temperature distribution, changes in temperature of the pixels vary from pixel to pixel. Accordingly, a ratio of temporal change in black level of the OPB pixels differs from a ratio of temporal change in black level of the other pixels. More specifically, correcting the other pixels using the ratio of temporal change in black level of the OPB pixels can produce an error, and lead to failure to compensate for the temporal change.

When the temperature distribution is nonuniform as illustrated in FIGS. 9 and 10, ratios of temporal change in black level also vary from pixel to pixel in a manner that depends on the temperature distribution. Accordingly, it can be stated that distribution of the black levels reflects the temperature distribution. An image scanning device according to a second embodiment is described below based on those described above. The image scanning device according to the second embodiment is configured to perform black correction as follows. Pixel-by-pixel black levels of pixels contained in pre-scanning digital image data obtained before an original is scanned are corrected based on distribution of dark-current black levels of pixels of the photoelectric conversion unit obtained before scanning of the original. The corrected pixel-by-pixel black levels are subtracted from ongoing-scanning digital image data obtained during scanning of the original.

Figure 11:
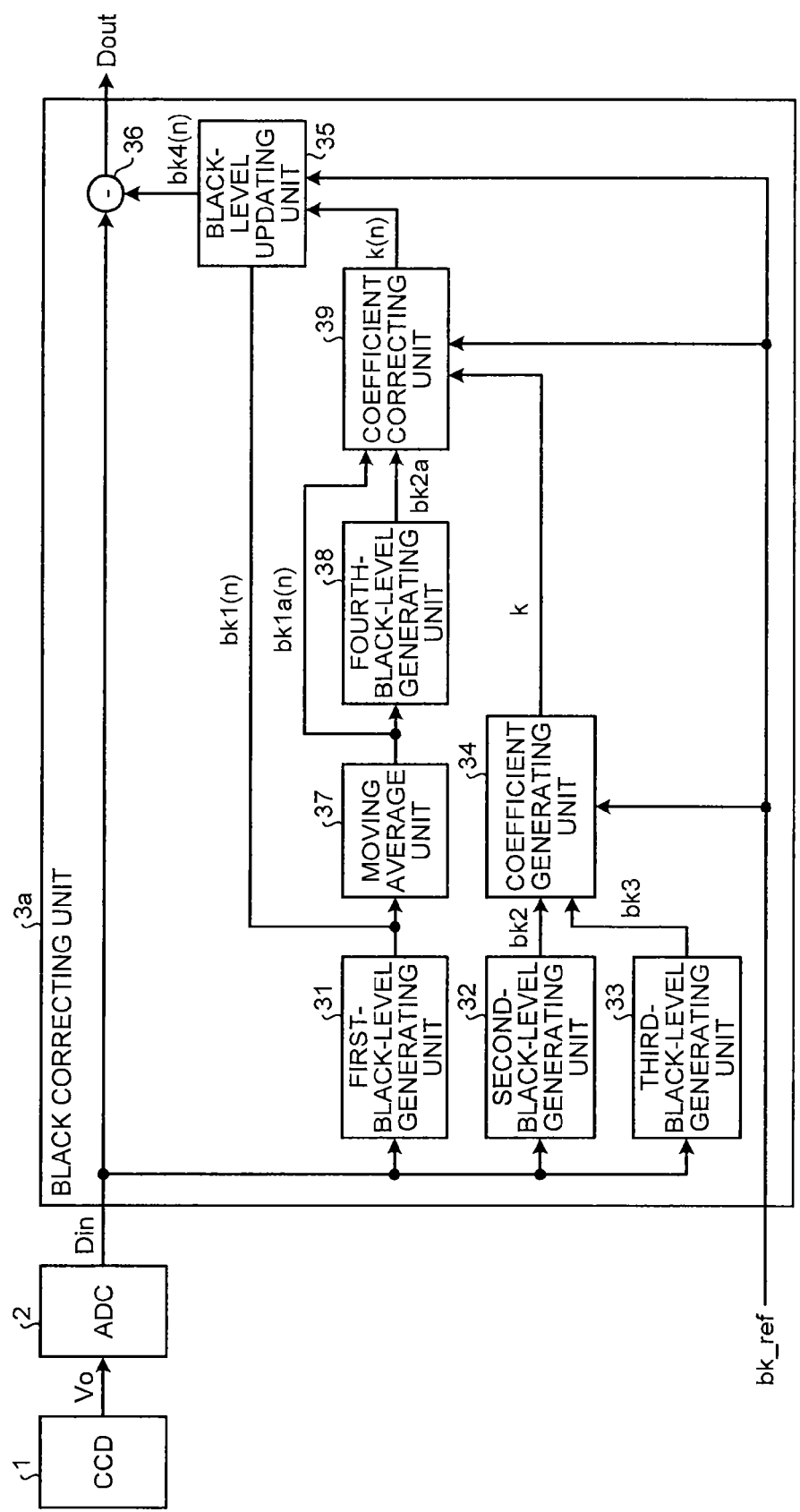
FIG. 11 is a block diagram illustrating a functional configuration for black correction according to a second embodiment.

FIG. 11 is a block diagram illustrating a functional configuration for black correction according to the second embodiment. As illustrated in FIG. 11, a black correcting unit 3a includes not only the first-black-level generating unit 31, the second-black-level generating unit 32, the third-black-level generating unit 33, the coefficient generating unit 34, the black-level updating unit 35, and the arithmetic unit 36 described above but also a moving average unit 37, a fourth-black-level generating unit 38, and a coefficient correcting unit 39.

The moving average unit 37 receives the pixel-by-pixel first black levels (bk1(n)) obtained by the first-black-level generating unit 31 and calculates moving averages of the first black levels (bk1(n)). The calculated pixel-by-pixel moving averages (bk1a(n)) of the first black levels are output to the fourth-black-level generating unit 38 and the coefficient correcting unit 39.

The fourth-black-level generating unit 38 obtains a black level (fourth black level) (bk2a) of an OPB pixel from the pixel-by-pixel black-level moving averages (bk1a(n)). The obtained fourth black level (bk2a) is output to the coefficient correcting unit 39.

The coefficient correcting unit 39 receives the pixel-by-pixel black-level moving averages (bk1a(n)), the fourth black level (bk2a), the change ratio (k), and the reference black level (bk_ref) and computes Equation (6) below, thereby correcting the change ratio (k) received from the coefficient generating unit 34 to pixel-by-pixel coefficients k(n) corresponding to the temperature distribution:

$$k(n)=k*\{a*(bk1a(n)-bk\_ref)/(bk2a-bk\_ref)+b\} \quad (6)$$

where n is the image signal and a+b=1.

The dark current Idark is proportional to the exponential function (exp) of the temperature T (see Expression (2)). Accordingly, more strictly, Equation (6) is expressed by an equation containing the exponential function. However, causing the coefficient correcting unit 39 to compute such an equation for exact solution undesirably involves an increase in size. Accordingly, in view of a relatively small temperature change (which can be approximated by linear function in a minute region of a curve of the exponential function) within a minute semiconductor chip, linear approximation expressed by Equation (6) is employed. The constants a and b in Equation (6) may preferably be calculated in advance from a relationship between actual dark current of the photoelectric transducer and temperature, and stored in a register or the like.

As described above, according to the second embodiment, black correction is performed as follows. Pixel-by-pixel black levels of pixels contained in pre-scanning digital image data obtained before an original document is scanned are corrected based on distribution of dark-current black levels of pixels contained in the pre-scanning digital image data. The corrected pixel-by-pixel black levels are subtracted from ongoing-scanning digital image data obtained during scanning of the original. Accordingly, it is possible to compensate for change over time in black correction appropriately even when pixel-by-pixel temperature distribution is non-uniform.

An example of an image forming apparatus to which the embodiment is applied is described below.

Figure 12:
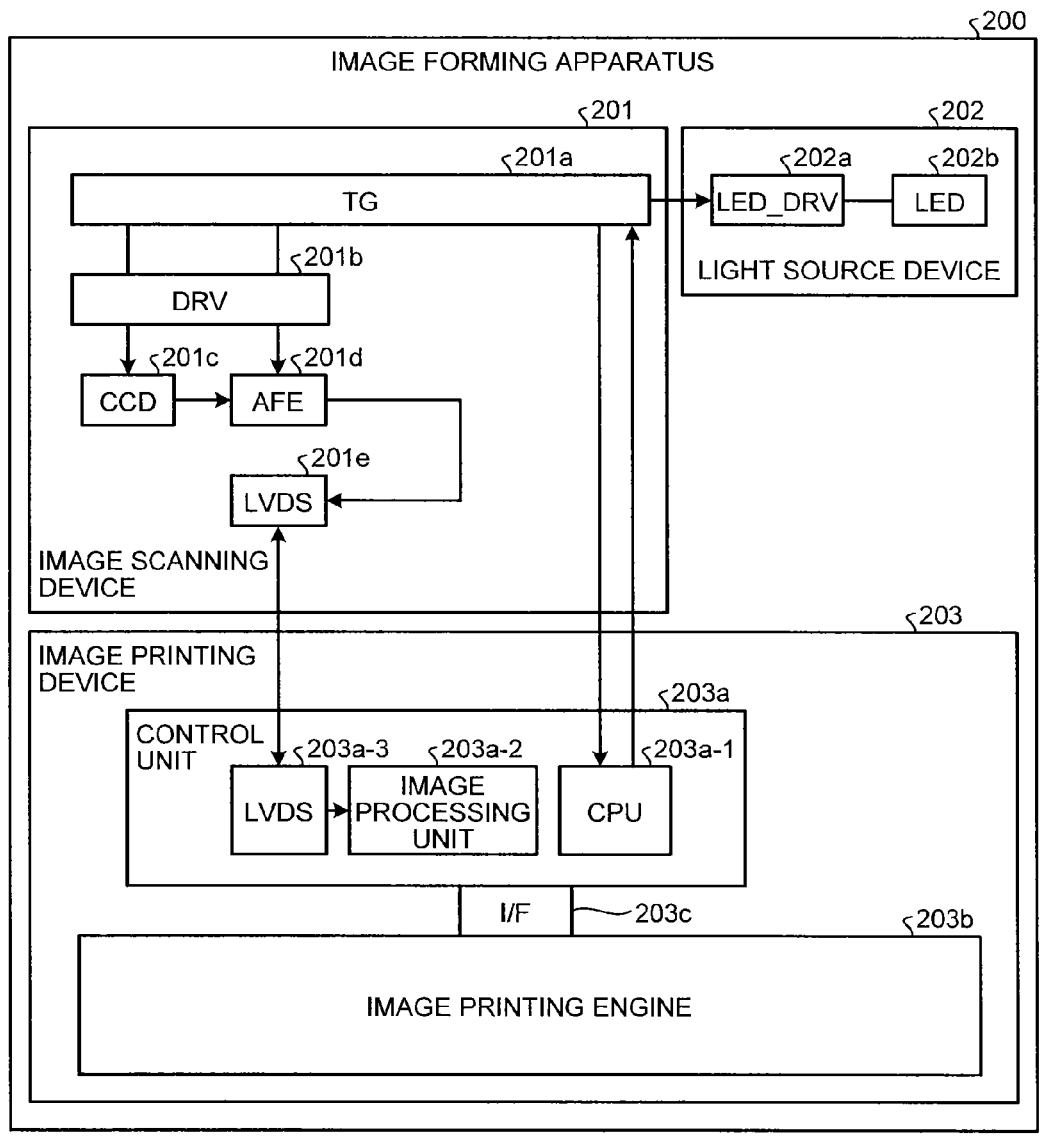
FIG. 12 is a block diagram of an example configuration of an image processing apparatus, to which the first or the second embodiment is applied.

FIG. 12 is a block diagram of one example of configuration of an image processing apparatus 200 to which the first (second) embodiment is applied. The image processing apparatus 200 to which the first (second) embodiment is applied includes an image scanning device 201, a light source device 202, and an image printing device 203.

The image scanning device 201 includes the TG 201a, a driver (DRV) 201b, a CCD 201c, an analog front end (AFE) 201d, and a low voltage differential signaling (LVDS) 201e. The light source device 202 includes a light emitting diode (LED) 202b and an LED_DRV 202a. The image printing device 203 includes the control unit 203a, an image printing engine 203b, and an interface (I/F) 203c. The control unit 203a of the image printing device 203 includes a central processing unit (CPU) 203a-1, an image processing unit 203a-2, and an LVDS 203a-3.

The TG 201a generates various signals related to operation timing for the image scanning device 201 and the like under control of the CPU 203a-1. More specifically, the TG 201a generates a line synchronization (LSYNC) signal, an original scanning period (FGATE) signal, a lamp (light source)-ON (LMPON) signal, first/second/third-black-level generating signals indicating timing for generation of the first/second/third black levels, a coefficient generating signal indicating timing for generation of the coefficient (k), and a black-level updating signal indicating timing for updating the black levels.

The TG 201a generates a lamp-on period signal (corresponding to the LMPON signal) and a current control signal, and outputs these signals to the LED_DRV 202a of the light source device 202. The TG 201a also generates an AFE control signal for controlling the AFE 201d and a shift gate signal, and outputs these signals to the DRV 201b. The DRV 201b controls the CCD 201c according to the shift gate signal output from the TG 201a, and controls the AFE 201d according to the AFE control signal.

The CCD 201c corresponds to the CCD 1 in the first and second embodiments. Light that is emitted onto a subject, such as an original document, placed on the image forming apparatus 200 and reflected from the subject is received as reflection light. Under control of the DRV 201b, the CCD 201c receives the reflection light, converts the received reflection light by photoelectric conversion into an analog image signal, and outputs the analog image signal to the AFE 201d. The AFE 201d corresponds to the ADC 2 in the first and second embodiments. The AFE 201d converts the analog image signal output from the CCD 201c into a digital image signal and outputs the digital image signal to the image printing device 203 via the LVDS 201e. In addition, the LVDS 201e is an interface for transmitting and receiving image data as same as the LVDS 203a-3 is.

In the light source device 202, the LED_DRV 202a controls a lamp-on period for the LED 202b according to the lamp-on period signal output from the TG 201a of the image scanning device 201, and controls instantaneous values of light amount of the LED 202b according to the current control signal. The LED 202b is controlled by the LED_DRV 202a to emit light onto the subject.

In the image printing device 203, the CPU 203a-1 of the control unit 203a performs overall control of the image printing device 203 and control of the TG 201a. The LVDS 203a-3 of the control unit 203a receives, via the LVDS 201e, an input of the digital image signal output from the image scanning device 201, and outputs the received digital image signal to the image processing unit 203a-2.

The image processing unit 203a-2 of the control unit 203a corresponds to the black correcting unit 3 (3a) in the first and second embodiments. The image processing unit 203a-2 performs image processing on image data, which is based on the digital image signal output from the LVDS 203a-3, and outputs the image-processed image data to the image printing engine 203b via the I/F 203c. The image processing performed by the image processing unit 203a-2 includes black correction described above. The image printing engine 203b drives a printing unit (not shown) to cause the image data output from the image processing unit 203a-2 to be output onto an image forming medium such as paper.

Each of the image scanning devices and the image forming apparatuses described in the first and second embodiments may be applied to an MFP having at least two functions of a copier function, a printer function, a scanner function, and a facsimile function. Each of the image scanning devices and the image forming apparatuses described in the first and seconds embodiments may be applied to any image forming apparatus, such as a copier, a printer, a scanner, or a facsimile.

According to an aspect of one embodiment of the present invention, it is possible to perform black correction appropriately even when amounts of change in dark current vary from pixel to pixel.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image scanning device comprising:
   a light source unit configured to emit light onto an original to be scanned;
   a photoelectric conversion unit configured to convert light reflected from the original to an electric signal;
   a converting unit configured to convert the electric signal from the photoelectric conversion unit into digital image data; and
   a black correcting unit configured to perform black correction by
      correcting pixel-by-pixel black levels of pixels contained in pre-scanning digital image data obtained before the original is scanned based on a ratio of a dark-current black level of a pixel contained in ongoing-scanning digital image data obtained during scanning of the original to a dark-current black level of the pixel contained in the pre-scanning digital image data, and
      subtracting the corrected pixel-by-pixel black levels from the ongoing-scanning digital image data.

2. The image scanning device according to claim 1, wherein the black correcting unit performs the black correction by
   correcting the pixel-by-pixel black levels of the pixels contained in the digital image data with reference to a reference black level of a zero-dark-current state, the reference black level being calculated from black levels obtained by causing the photoelectric conversion unit to accumulate light for different periods of time, and
   subtracting the corrected pixel-by-pixel black levels from the ongoing-scanning digital image data.

3. The image scanning device according to claim 1, wherein the black correcting unit includes
   a first-black-level obtaining unit configured to obtain pixel-by-pixel first black levels from the pre-scanning digital image data,
   a second-black-level obtaining unit configured to obtain a second black level of an optical black pixel of the photoelectric conversion unit from the pre-scanning digital image data,
   a third-black-level obtaining unit configured to obtain a third black level of the optical black pixel from the ongoing-scanning digital image data,
   a coefficient calculating unit configured to calculate a coefficient that depends on a ratio of change in black level between when the pre-scanning image data is obtained and when the ongoing-scanning image data is obtained from the second black level and the third black level,
   a black-level correcting unit configured to correct the pixel-by-pixel black levels by multiplying the first black levels by the calculated coefficient, and
   an arithmetic unit configured to subtract the corrected pixel-by-pixel black levels from the ongoing-scanning digital image data.

4. The image scanning device according to claim 3, wherein
   the first black levels and the second black level are obtained from digital image data obtained by converting, by the converting unit, data that is obtained in a first period, in which the light source unit is not emitting light, by the photoelectric conversion unit by performing reading and
   the third black level is obtained from digital image data obtained by converting, by the converting unit, data that is obtained by the photoelectric conversion unit by performing reading line by line in a second period, in which the light source unit is emitting light to scan the original.

5. The image scanning device according to claim 4, wherein
   the first black levels and the second black level are obtained from digital image data obtained by the converting unit by converting data that is obtained by the photoelectric conversion unit by performing reading in the first period, and
   the third black level is obtained from digital image data obtained by the converting unit by converting data that is obtained by the photoelectric conversion unit by performing reading line by line in a third period, in which the original is not scanned but the light source unit is emitting light.

6. The image scanning device according to claim 5, wherein
   the first black levels are obtained from digital image data obtained by the converting unit by converting data that is obtained by the photoelectric conversion unit by performing reading in the first period, and
   the second black level and the third black level are obtained from digital image data obtained by the converting unit by converting data that is obtained by the photoelectric conversion unit by performing reading in the third period.

7. The image scanning device according to claim 3, wherein
   the second black level is any one of a mean value of a plurality of pixels of the photoelectric conversion unit and a mean value of a plurality of lines of the photoelectric conversion unit, and
   the third black level is a weighted average of every line of the photoelectric conversion unit.

8. The image scanning device according to claim 3, wherein each of the second black level and the third black level is any one of a mean value of a plurality of pixels of the photoelectric conversion unit and a mean value of a plurality of lines of the photoelectric conversion unit.

9. An image scanning device comprising:
a light source unit configured to emit light onto an original to be scanned;
a photoelectric conversion unit configured to convert light reflected from the original to an electric signal;
a converting unit configured to convert the electric signal from the photoelectric conversion unit into digital image data; and
a black correcting unit configured to perform black correction by
   correcting pixel-by-pixel black levels of pixels contained in pre-scanning digital image data obtained before the original is scanned based on distribution of dark-current black levels of pixels contained in the pre-scanning digital image data, and
   subtracting the corrected pixel-by-pixel black levels from ongoing-scanning digital image data obtained during scanning of the original.

10. The image scanning device according to claim 9, wherein the black correcting unit includes
a first-black-level obtaining unit configured to obtain pixel-by-pixel first black levels from the pre-scanning digital image data,
a second-black-level obtaining unit configured to obtain a second black level of optical black pixels of the photoelectric conversion unit from the pre-scanning digital image data,
a third-black-level obtaining unit configured to obtain a third black level of the optical black pixels from the ongoing-scanning digital image data,
a coefficient calculating unit configured to calculate a coefficient corresponding to a ratio of change in black level between when the pre-scanning image data is obtained and when the ongoing-scanning image data is obtained from the second black level and the third black level,
a moving average unit configured to calculate pixel-by-pixel moving averages of the first black levels,
a fourth-black-level obtaining unit configured to obtain a fourth black level of the optical black pixels from the pixel-by-pixel moving averages of the black levels,
a coefficient correcting unit configured to correct the calculated coefficient with ratios of the pixel-by-pixel moving averages of the black levels to the fourth black level,
a black-level correcting unit configured to correct the pixel-by-pixel black levels by multiplying each of the first black levels by corresponding one of the corrected coefficients, and
an arithmetic unit configured to subtract the corrected pixel-by-pixel black levels from the ongoing-scanning digital image data.

11. An image forming apparatus comprising the image scanning device according to claim 1.

12. An image forming apparatus comprising the image scanning device according to claim 9.

\* \* \* \* \*